(12) United States Patent
Brown

(10) Patent No.: US 8,491,031 B1  
(45) Date of Patent: Jul. 23, 2013

(54) PARTIAL BED COVER WITH TAILGATE SEAL

(76) Inventor: Aaron Dale Brown, Lenore, WV (US)

( * ) Notice: Subject to any disclaimer, the term of this patent is extended or adjusted under 35 U.S.C. 154(b) by 0 days.

(21) Appl. No.: 13/224,842

(22) Filed: Sep. 2, 2011

Related U.S. Application Data

(60) Provisional application No. 61/386,105, filed on Sep. 24, 2010.

(51) Int. Cl.
  *B60P 1/04* (2006.01)
  *B60P 1/34* (2006.01)
(52) U.S. Cl.
  USPC .............. 296/100.02; 296/183.2; 296/146.9; 49/475.1

(58) Field of Classification Search
  USPC ............... 296/100.02, 100.01, 50–53, 183.2, 296/146.9; 49/489.1, 475.1, 495.1, 493.1
  See application file for complete search history.

(56) References Cited

U.S. PATENT DOCUMENTS

| | | | |
|---|---|---|---|
| 3,751,112 A * | 8/1973 | Hagenbuch | 298/23 DF |
| 4,097,090 A * | 6/1978 | Payne et al. | 298/1 SG |
| 5,021,156 A * | 6/1991 | Sloan | 210/241 |
| 8,002,359 B2 * | 8/2011 | Dormaier | 298/23 R |

* cited by examiner

*Primary Examiner* — Glenn Dayoan  
*Assistant Examiner* — Melissa A Black  
(74) *Attorney, Agent, or Firm* — Camoriano & Associates

(57) ABSTRACT

A partial cover and tailgate seal is added to the bed of a truck or trailer to prevent a slurry-type load from overflowing the tailgate of the bed when traversing steep terrain and to help seal the interface between the tailgate and the bed.

7 Claims, 4 Drawing Sheets

PARTIAL BED COVER WITH TAILGATE SEAL

BACKGROUND

This application claims priority from U.S. Provisional Application Ser. No. 61/386,105, filed Sep. 24, 2010, which is hereby incorporated herein by reference. The present invention relates to a partial bed cover and tailgate seal for use in many trucks, particularly dump trucks and articulated haulers.

Many dump trucks, including articulated haulers and off-road dump trucks, are used to haul material to an off-site location. Often times the material is a slurry, such as mud, containing a liquid, usually water. Strict regulations control the transport of this material to ensure that the mud does not escape from the bed of the truck or trailer. This is a particular problem in mountainous regions, because, when climbing a steep hill, the mud tends to flow to the rear of the trailer and may overflow over the top of the tail gate and leak along the full width of the truck bed along the line where the tailgate abuts the bed.

So far, the solution has been to load the truck with far less than a full load so that the trailer will not overflow. This makes the hauling very inefficient and expensive as well as adding undesirable traffic on mountain roads. It also does not solve the problem of leakage of liquid along the line where the tailgate abuts the bed.

SUMMARY

One embodiment of a solution to that problem is described herein. It includes a partial bed cover with a tailgate seal. The cover extends from the rear of the truck or trailer bed toward the front a distance that is sufficient to prevent the load from overflowing the tailgate while still allowing ample space for a bucket or other loader to load the truck or trailer bed. Preferably, the cover extends from one-eighth to one-half of the length of the bed. The cover further includes a flexible mud flap extending downwardly to seal along the line where the tailgate abuts the bed.

DETAILED DESCRIPTION

Figure 1:
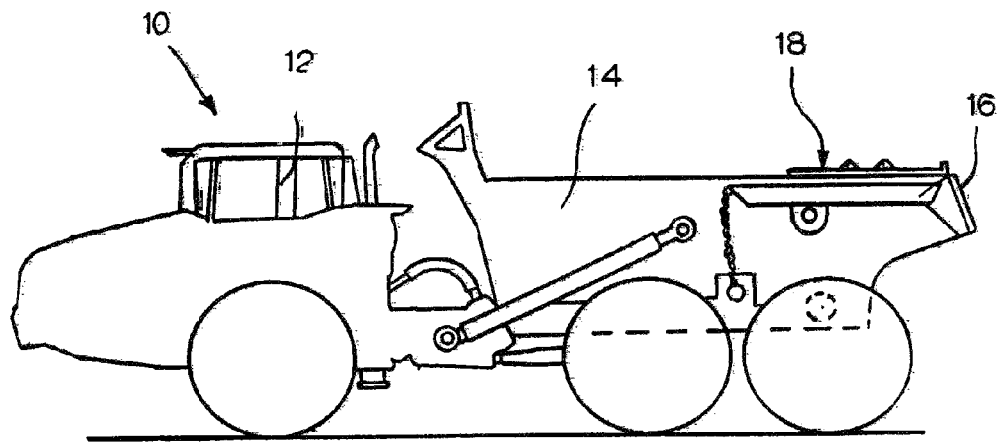
FIG. 1 is a side view of an articulated hauler with a partial bed cover and tailgate seal installed, with the bed in the lowered or hauling position.
Figure 2:
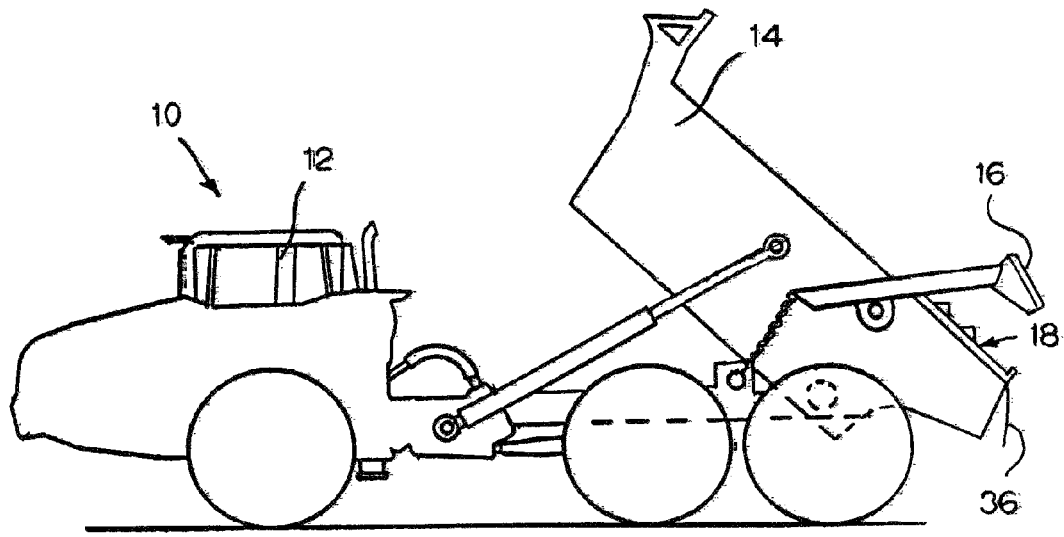
FIG. 2 is the same view as FIG. 1, but with the bed in the raised or dumping position.

FIGS. 1 and 2 are side views of an articulated hauler or truck 10 including a cab 12 and a bed 14 with a tailgate 16. The bed 14 is supported on wheels and is shown with an embodiment of a partial cover and tailgate seal 18 mounted on the bed 14 for increasing the load that can be carried by the bed 14, as described in more detail below. The hauler 10 includes a hydraulic lift for raising and lowering the bed 14, as is well known in the art.

Figure 3:
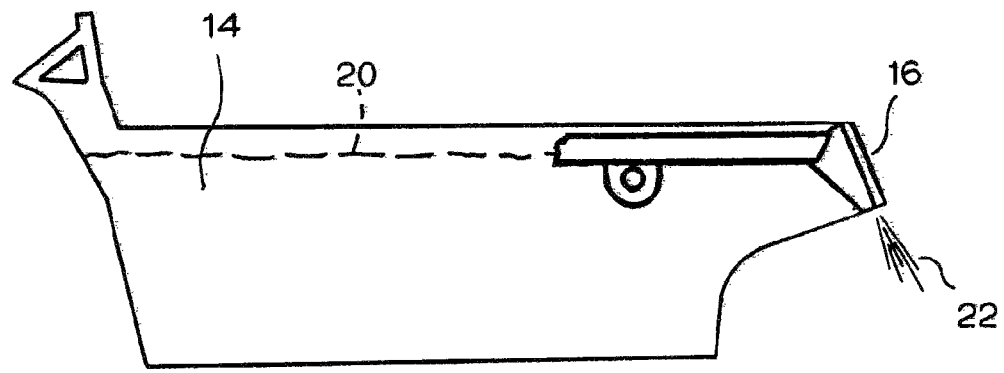
FIG. 3 is a schematic side view of the bed of FIG. 1 but without the cover and seal, showing the level of mud when the bed is fully loaded and on level ground.

FIG. 3 shows the bed 14 of the hauler 10 without the cover and seal 18 of FIG. 1. In this view, the hauler 10 is on level ground and the trailer bed 14 is in the lowered position, with a full load of mud depicted by the dotted line 20. It can be appreciated that some muddy water 22 leaks past the tailgate 16 along the line where the tailgate 16 abuts the bottom edge of the rear opening of the bed 14.

Figure 4:
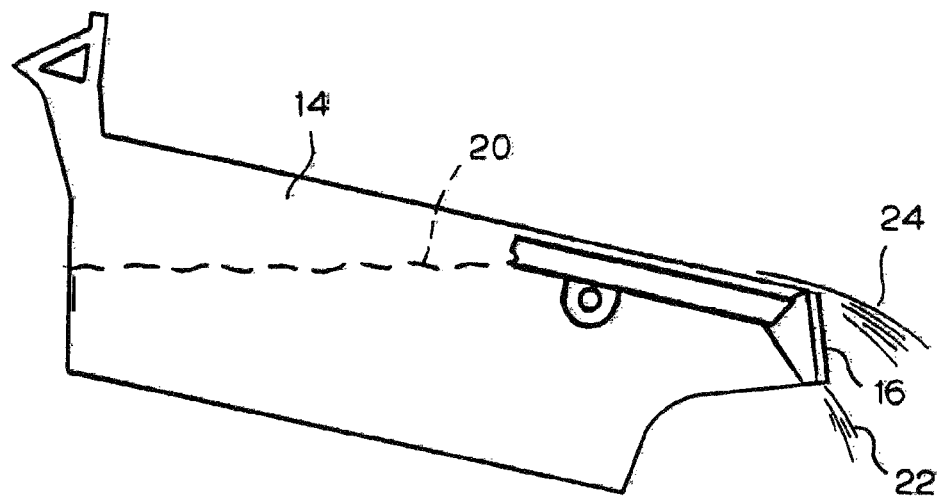
FIG. 4 is the same as FIG. 3, but showing the condition when the truck is traveling uphill, with the mud shifting and overflowing the top of the tailgate.

FIG. 4 shows the same bed 14 as FIG. 3 when the truck 10 is climbing a moderate 10 degree grade. It may be appreciated that the load has shifted rearwardly, and a substantial amount of mud 24 is overflowing the top of the tailgate 16, in addition to the muddy water 22 leaking through the gap between the bottom edge of the rear opening and the tailgate 16, along which the tailgate 16 abuts the bed 14. As the steepness of the grade traversed by the truck 10 is increased, this problem becomes even worse.

Figure 5:
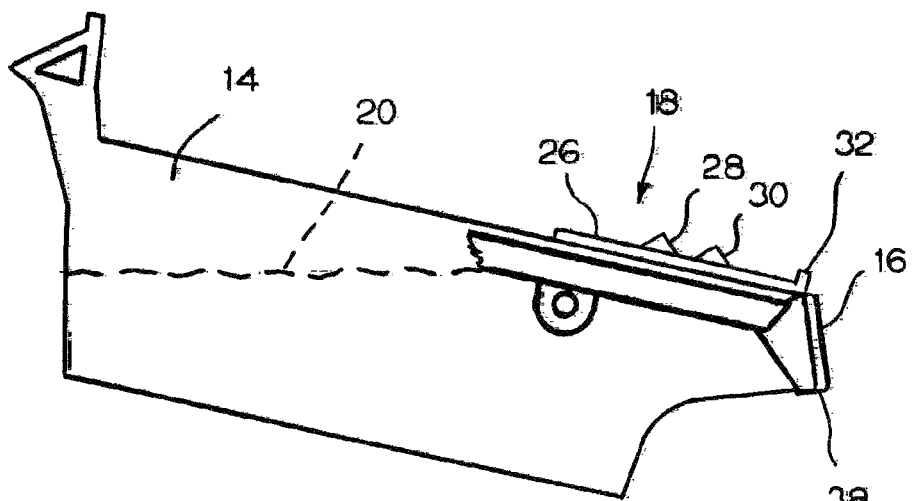
FIG. 5 is a the same as FIG. 4, but with a partial bed cover and tailgate seal installed.

FIG. 5 shows the bed 14 when the hauler 10 is climbing the same 10 degree grade shown in FIG. 4, but this time the bed 14 is equipped with a rigid partial cover and tailgate seal assembly 18. It may be appreciated that the mud is no longer able to overflow over the top of the tailgate 16, and even the leak at the base of the tailgate 16 has been eliminated.

Figure 6:
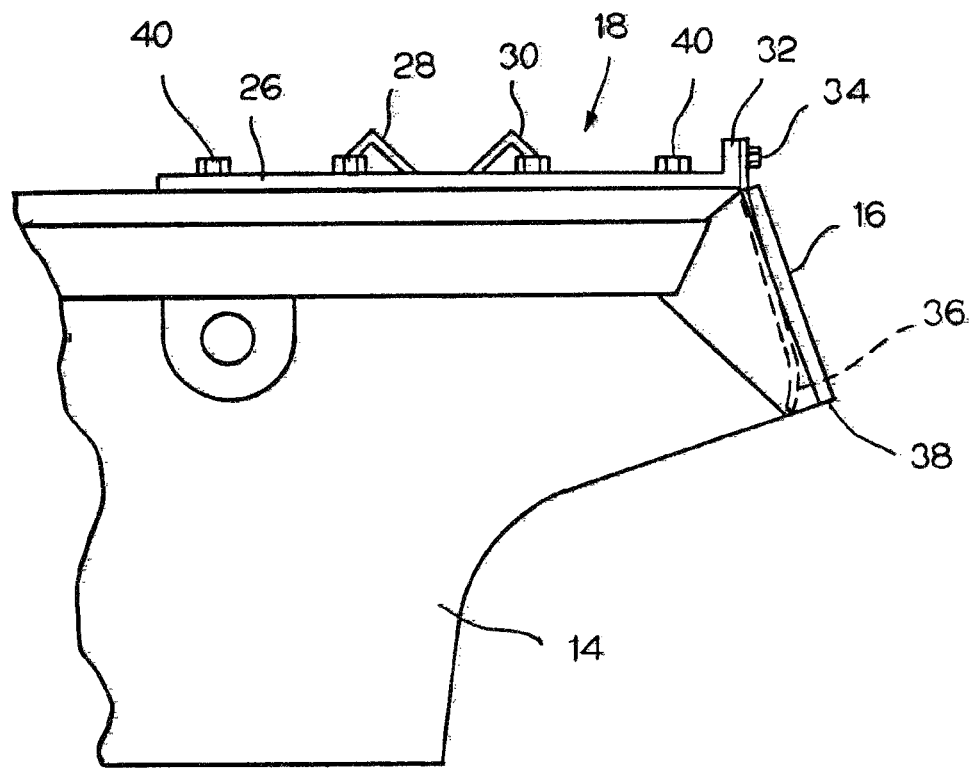
FIG. 6 is an enlarged, broken away side view of the bed of FIG. 5, with the truck on level ground, and showing the tailgate seal in phantom.
Figure 7:
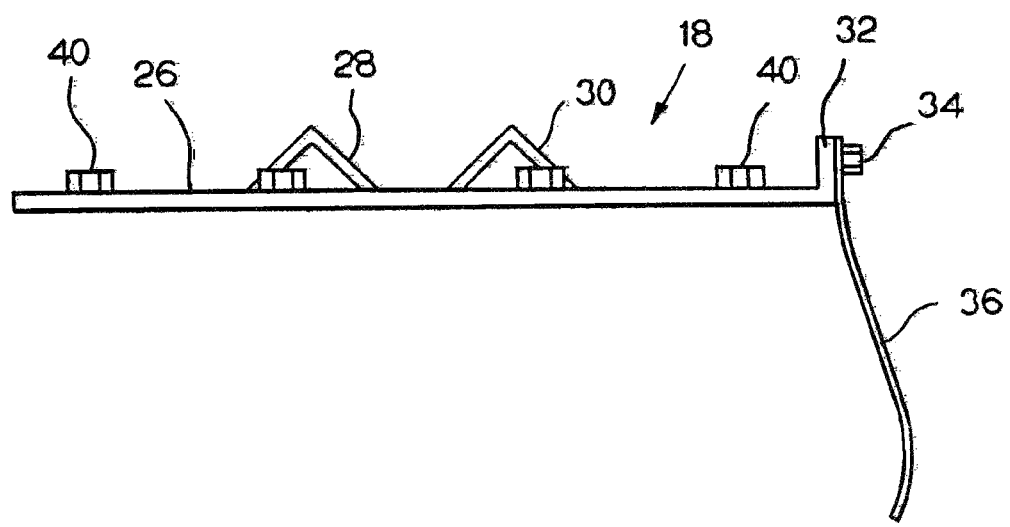
FIG. 7 is a side view of the partial bed cover and seal of FIG. 6.
Figure 8:
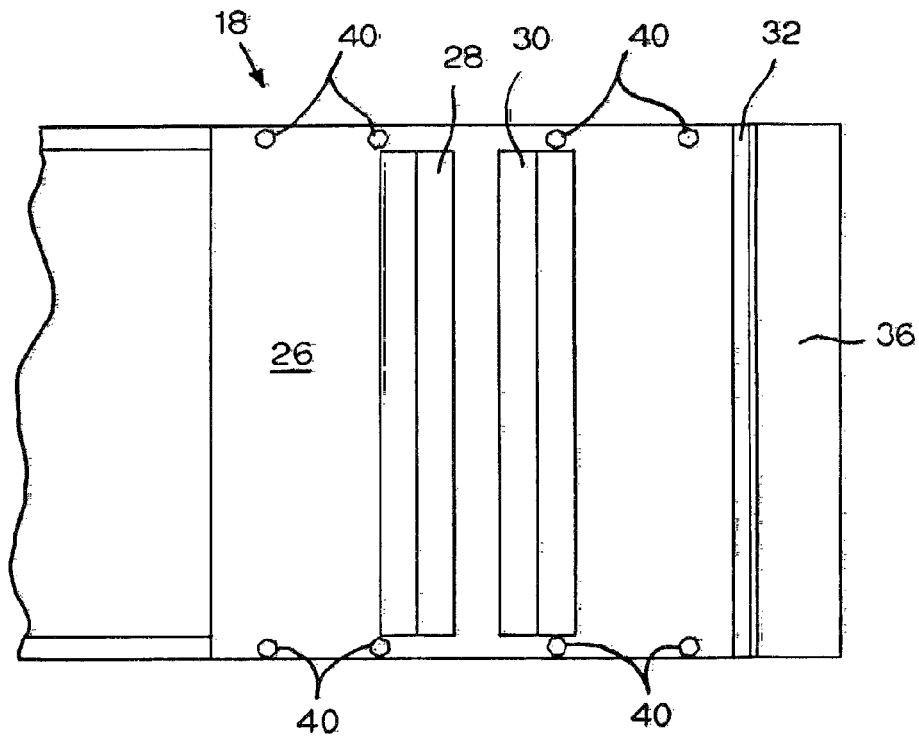
FIG. 8 is a broken-away, top view of the bed of FIGS. 5 and 6 with the tailgate removed for clarity.

Referring now to FIGS. 6-8, the bed 14 has a generally horizontal bottom and generally vertical left, right, and front sides, extending upwardly to an open top edge. A rear opening is defined by the left and right sides and tapered rear side of the bed 14. The rear opening is enclosed by a movable tailgate 16. The top edge of the bed 14 is enclosed from the rear opening toward the front by a substantially flat plate 26, which in this embodiment is a solid metal plate, which extends from the left side to the right side of the top edge. The plate 26 is bolted to the left and right top edges of the bed 14 and extends from the rear of the bed toward the front a distance from one-eighth to one-half of the full front-to-rear length of the bed 14, leaving an opening of at least ten feet in the front-to-rear direction, and preferably at least twelve feet or more, or large enough to allow the bed 14 to be loaded easily using a bucket loader or other mechanical loader.

Two straight, parallel pieces of angle iron 28, 30 extend in the left-to-right direction across the width of the plate 26 and are welded to the plate 26 to serve as reinforcing beams to provide additional structural strength to the plate 26 in order to handle the pressure of the load of mud pushing against the plate 26 so the plate 26 will not bow or buckle. A third parallel straight piece of angle iron 32 is welded to the rear end of the plate 26 to provide a surface onto which to secure a flexible, rubber mud flap 36 to the plate 26. In this embodiment, the mud flap 36 is secured to the plate 26 by means of bolts 34 that extend through the mud flap 36 and through the angle iron 32. The reinforced plate 26 and mud flap 36 together form the partial cover and tailgate seal assembly 18 (See FIG. 7).

Referring to FIGS. 6 and 7, the mud flap 36 extends slightly beyond the line 38, which is the bottom edge of the rear opening, and which is where the bottom edge of the tailgate 16 abuts the truck bed 14, such that, when the tailgate 16 is in the closed position, as shown in FIG. 6, the mud flap 36 lies inside the tailgate 16, and the mud or other slurry inside the truck bed 14 pushes the mud flap against the truck bed and against the tailgate 16, forming a seal along that line 38.

The mud flap 36 also seals between the top of the tailgate 16 and the rigid plate 26, since it is bolted to the rear edge of the rigid plate 26 and extends downwardly past the top of the tailgate 16.

As shown in FIGS. 6 and 8, the mud flap 36 fits inside the bed 14 and inside the tailgate 16, with a small clearance between the flap 36 and the left and right sides of the bed 14. The rear face of the flap 36 abuts the tailgate 16. Any mud in the bed 14 presses against the mud flap 36, pushing it against the tailgate 16 and creating a seal that prevents the slurry from seeping out around the top or bottom of the closed tailgate 16. The mud flap 36 is preferably made from a strong, yet flexible material, such as rubber, while the plate 26 is made from a much more rigid material, such as a thick, solid sheet of metal.

Figure 9:
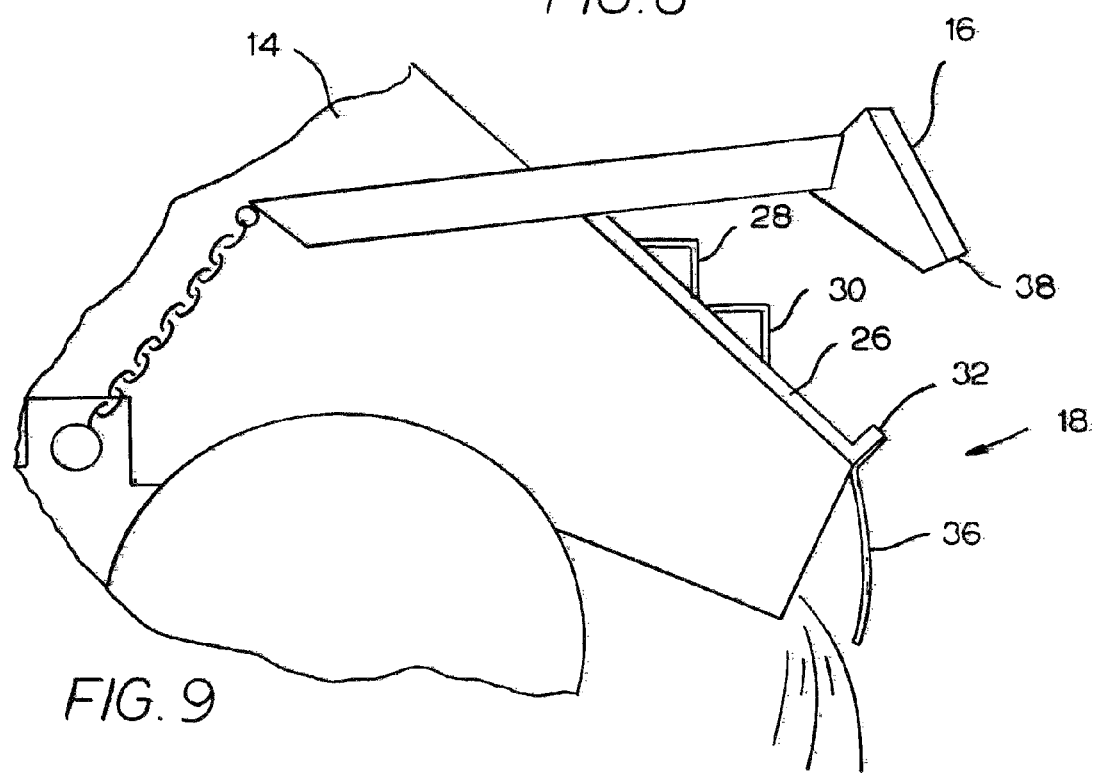
FIG. 9 is a broken-away, side view of the bed of FIG. 6, shown in the raised position (dump position).

When the bed 14 is tilted rearwardly for unloading, as shown in FIG. 9, the bed 14 separates from the tailgate 16, so the tailgate 16 no longer encloses the rear opening of the bed 14, and mud flows out through the rear opening, pushing the mud flap 36 rearwardly, out of the way, so the mud flap 36 does not interfere with the material flowing out the rear opening of the bed 14.

When the bed 14 is returned to its normal position, it moves back into alignment with the tailgate 16, and the tailgate 16 pushes the mud flap 36 back into the bed 14, to the position shown in FIG. 6.

Since the plate 26 and flap 36 do not interfere with the normal operation of the tailgate, various types of beds and tailgates can accommodate this same partial cover and tailgate seal 18. For example, in a different known type of bed, the tailgate remains fixed along its top edge to the top rail of the bed and pivots rearwardly about the top edge to allow the load to flow out the open rear of the bed when the bed is raised for unloading. The bottom edge of the tailgate may be pinned to the bed and the pin may be removed in order to allow the tailgate to pivot for unloading, as is known in the art. In that case, again the flap 36 would seal the top and bottom edges of the tailgate when the tailgate is closed, would be pushed out of the way by the load when the bed is tilted for unloading, and would return to its initial position when the tailgate is closed.

In the embodiment shown here, the partial cover and tailgate seal assembly 18 is installed along the top rail (top edge) of the bed 14 with the mud flap 36 lined up against the rear edge of the bed, where the tailgate 16 closes the rear of the bed 14. In order to install the partial cover and tailgate seal assembly 18, the mud flap 36 is first bolted onto the plate 26, and then the assembly is placed on top of the bed 14. It may be lifted up with the aid of a crane or an A-frame and then secured. In this embodiment, it is secured to the top edge of the left and right sides of the bed 14 using bolts 40 as shown in FIG. 8. Of course, other methods for securing the plate 26 to the bed 14 may be used, such as welding, for instance.

The mud or other slurry may be loaded into the bed 14 through the remaining open area forward of the plate 26. The shorter the length of the plate 26, the more open area is available for loading the bed 14, which is desirable for ease of loading. On the other hand, the longer the length of the plate 26, the steeper the grade which can be negotiated without overflowing the load over the tailgate 16, given a certain size load (or, conversely, the larger the load which can be handled without overflowing the tailgate 16, given a certain degree of grade). Thus, a decision has to be made to determine the optimum length of the plate and the optimum length of the remaining opening to provide both ease of loading and securing of the mud or other slurry for the degree of grade or slope that is anticipated.

It will be obvious to those skilled in the art that various modifications may be made to the embodiments described above without departing from the scope of the present invention as claimed.

What is claimed is:

1. A bed for a truck or trailer, comprising:
   a bottom;
   left and right side walls and a front wall extending from said bottom to a top edge defining a top opening, said left and right side walls also defining a rear opening having a width and height and a bottom edge, said rear opening being enclosed by a tailgate when the tailgate is in the closed position, said tailgate being movable to an open position for discharging material out the rear opening;
   a rigid cover extending from the left side wall to the right side wall at the top edge and extending from the rear opening forward toward the front wall, leaving an open space between the cover and the front wall of at least ten feet in the front-to-rear direction, said rigid cover being fixed to said left and right side walls and being separate from said tailgate; and
   a flexible flap which is a sheet extending downwardly from the rear of said rigid cover and across the width and height of said rear opening to a point beyond the bottom edge of said rear opening.

2. A bed for a truck or trailer as recited in claim 1, wherein said rigid cover is made of solid metal plate, and further including reinforcing beams fixed to said metal plate.

3. A bed for a truck or trailer as recited in claim 1, wherein said flexible flap is not attached to the tailgate, lies inside the tailgate when the tailgate is closed and flexes outwardly to allow material to flow out the rear opening when the tailgate is open.

4. A bed for a truck or trailer as recited in claim 3, wherein said rigid cover is rigidly fixed to the left and right sidewalls.

5. A bed for a truck or trailer, comprising:
   a bottom;
   left and right side walls and a front wall extending from said bottom to a top edge defining a top opening, said left and right side walls also defining a rear opening having a bottom edge, said rear opening having a width and height being enclosed by a tailgate when the tailgate is in the closed position, said tailgate being movable to an open position for discharging material out the rear opening;
   a rigid cover extending from the left side wall to the right side wall at the top edge and extending from the rear opening forward toward the front wall, leaving an open space between the cover and the front wall of at least ten feet in the front-to-rear direction; and
   a flexible flap which is a sheet extending downwardly from the rear of said rigid cover and across the width and height of said rear opening to a point beyond the bottom edge of said rear opening;
   wherein said flexible flap includes means for sealing between the movable tailgate and the bottom edge of said rear opening and between the tailgate and the rigid cover when said tailgate is closed; and means for allowing material to flow out of said rear opening when said tailgate is open.

6. A bed for a truck or trailer as recited in claim 5, wherein said flexible flap lies inside the tailgate when the tailgate is closed.

7. A bed for a truck or trailer as recited in claim 6, wherein said rigid cover is fixed to said left and right side walls and is separate from said tailgate.

\* \* \* \* \*